United States Patent Office 2,783,531
Patented Mar. 5, 1957

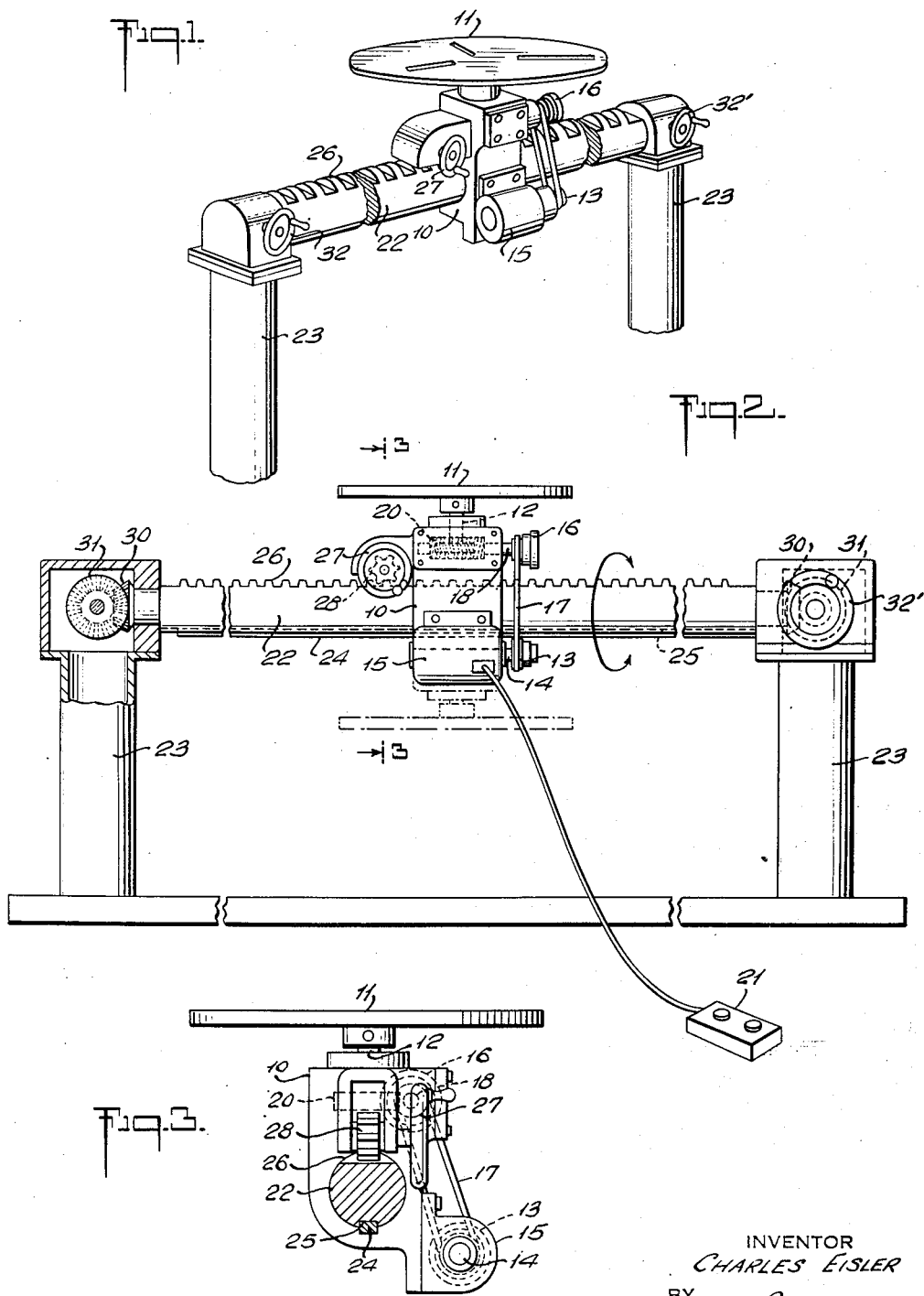

2,783,531

WORK HOLDER TURNTABLE MECHANISM

Charles Eisler, South Orange, N. J.

Application December 4, 1953, Serial No. 396,121

5 Claims. (Cl. 29—288)

This invention relates to work holders, and more particularly to the provision of a work holder turntable mechanism including novel features shown in the drawings and described below, materially enhancing the utility and adaptability of the device. The device, as will be apparent from a consideration of the description below, is adapted for use in connection with an infinite variety of manufacturing procedures as a highly versatile tool for use in connection with work holder turntables. By means of the mechanism of the present invention, the turntable may be readily moved in a relatively horizontal plane, in a plane at right angles thereto, and in a third plane, if so desired, or in two or three of such planes simultaneously.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

In the drawings:

Fig. 1 is a perspective view partly fragmentary, of a work holder turntable mechanism embodying the invention, Fig. 2 is an elevational view thereof and Fig. 3 is an enlarged vertical sectional view, taken on line 3—3 of Fig. 2.

As shown in the drawings, the work holder turntable mechanism of this invention comprises a casing 10 in which a work holder turntable 11 is rotatably positioned, as, for example, by providing said turntable 11 with shaft 12 which may be rotatably journalled in the casing 10. The casing is further preferably provided with means for rotating the turntable, such as the pulley 13 keyed to the armature shaft 14 of the motor 15 and driving a pulley 16 as by means of the belt 17. The pulley 16 is keyed to the shaft 18, which, internally of the casing 10, is provided with a gear in mesh with a gear keyed to the work table shaft 12. Such meshing gears are indicated by the reference character 20 in Fig. 2.

The pulleys 13 and 16 may be multiple step cone pulleys or otherwise so designed as to permit adjustment of the belt 17 to be made thereon for varying the speed of rotation of the shaft 18 (and thereby of the turntable 11). Any other suitable means for translating the power exertion of the motor 15 to the turntable 11 may be substituted for that above described, within the spirit and scope of the invention. Suitable control means 21 may be provided for the motor 15 to thereby control the rotation of the turntable 11. It will be apparent from the foregoing description that articles of various types may be positioned on the turntable 11 and rotation of said turntable controlled readily by the means above described.

Pursuant to one feature of the present invention, complementary means are providid on the casing and a supporting bar 22 on which it may be positioned, for movement of the casing relative to the bar. One form of such means will now be more particularly described. The opposite ends of the bar 22 are preferably rotatably journalled in upright standards 23, and complementary means may be provided for keying the casing to the bar for aligned movement of the former along the latter. As shown in Figs. 2 and 3, said means may comprise a key 24 which may be provided on the casing 10 received in a keyway 25 on the supporting bar 22. A track member 26 may be provided on the bar, and the casing may be provided with a rotatable member 27 engageable with the track 26 member. The track member may be a rack, as shown in Fig. 2, with which a pinion 28 keyed to the member 27 meshes. The member 27 may be a handwheel which will provide a simple means for moving the casing along the track, or it may be a motor-driven wheel. It will be understood that the track 26 might be smooth-faced, if so desired, and the member 28 engaging the same might be a friction wheel instead of a pinion.

The casing may be rotated at right angles to the longitudinal axis of the bar 22 (arrow, Fig. 2) by means, such as shown in Figs. 2 and 3 of the drawings, by way of example, or by any other means suited to that end. Said means may comprise a gear 30 keyed to the end of the bar 22, and in mesh with the gear 31 journalled in the standard 23, the gear 31 having keyed thereto an operating handle 32 by the rotation of which, as will be apparent from a consideration of Fig. 2, the bar 22 may be rotated to thereby rotate the casing 10 to thereby position the turntable 11 at a plane other than that shown in full lines in Fig. 2.

The gear 31 may be motor-driven, if so desired. If desired, a duplicate hand wheel 32' may be provided, with a gear in mesh with a gear at the other end of the bar 22, as shown in Fig. 2.

Having thus described my invention, what I claim as new and desire to secure by Letters Patent is:

1. A work holder mechanism comprising a pair of laterally spaced and vertically disposed standards, a horizontally disposed bar having its opposite ends rotatably supported in the upper ends of said standards, cooperating means in said standards and on said bar for rotating the latter about a horizontal axis, a casing supported on said bar for movement axially thereof, cooperating means on said casing and said bar for moving said casing axially of said bar, a work supporting turntable rotatably supported by said casing on an axis normal to said first axis, and means supported by said casing for rotating said turntable.

2. The structure according to claim 1, wherein said first means comprise a bevel gear on each end of said bar and disposed within the respective standard, and a manually rotatable bevel gear within each standard in driving mesh with a respective first named bevel gear.

3. The structure according to claim 1, wherein an elongated key is supported by said casing, and an elongated key way in said bar in which said key is received for movement of said casing axially only of said bar.

4. The structure according to claim 1, wherein said second means comprise a rack on said bar, a pinion rotatably supported by said casing and operatively engaged with said rack, and a hand wheel connected to said pinion for rotating same and a consequent movement of said casing axially of said bar.

5. The structure according to claim 1, wherein said last means comprise a motor driven shaft adjacent the bottom of said casing, a second shaft rotatably supported by said casing above and parallel to said first shaft, gears interconnecting said last shaft and said turntable, and drive means between said shafts.

References Cited in the file of this patent

UNITED STATES PATENTS

| | | |
|---|---|---|
| 367,782 | Brown | Aug. 9, 1887 |
| 996,226 | Ebeling | June 27, 1911 |
| 1,207,535 | Gardner | Dec. 5, 1916 |
| 1,316,221 | Conradson | Sept. 16, 1919 |
| 1,550,651 | Charter | Aug. 18, 1925 |
| 1,659,228 | Williams | Feb. 14, 1928 |
| 2,208,251 | Evans | July 16, 1940 |
| 2,303,459 | Hinderer | Dec. 1, 1942 |
| 2,445,016 | Bentley | July 13, 1948 |